United States Patent [19]
Eyler

[11] Patent Number: 5,824,611
[45] Date of Patent: *Oct. 20, 1998

[54] DUAL PURPOSE CLEANING CARD

[75] Inventor: Stanley Hamilton Eyler, Simi Valley, Calif.

[73] Assignee: Clean Team Company, San Diego, Calif.

[ * ] Notice: The term of this patent shall not extend beyond the expiration date of Pat. No. 5,525,417.

[21] Appl. No.: 613,293

[22] Filed: Mar. 11, 1996

Related U.S. Application Data

[63] Continuation of Ser. No. 323,151, Oct. 14, 1994, Pat. No. 5,525,417.

[51] Int. Cl.⁶ .............................. B32B 27/00; A47L 25/00
[52] U.S. Cl. ..................... 442/401; 15/210.1; 15/118; 15/105; 15/DIG. 12; 442/382; 451/540
[58] Field of Search ..................... 428/219, 220, 428/284, 286, 287; 15/210.1, 118, 105, DIG. 12; 451/540; 442/401, 382

[56] References Cited

U.S. PATENT DOCUMENTS

| | | | |
|---|---|---|---|
| 3,396,420 | 8/1968 | Mitchell | 15/210 |
| 3,857,133 | 12/1974 | Linenfelser | 15/104.93 |
| 3,978,520 | 8/1976 | Nowicki et al. | 358/10 |
| 4,891,265 | 1/1990 | Samagalsky | 428/280 |
| 4,933,015 | 6/1990 | White | 134/6 |
| 4,951,425 | 8/1990 | Naghi | 51/205 WG |
| 5,201,093 | 4/1993 | Wells et al. | 15/210.1 |
| 5,227,226 | 7/1993 | Rzasa | 428/219 |
| 5,320,900 | 6/1994 | Oathout | 428/288 |
| 5,408,718 | 4/1995 | Sadovsky | 15/118 X |
| 5,525,417 | 6/1996 | Eylr | 428/286 |

*Primary Examiner*—Daniel Zirker
*Attorney, Agent, or Firm*—Lewis Anten, Esq.; Amedeo Ferraro, Esq.

[57] ABSTRACT

A cleaning card has a flat, semirigid base with a first and second material mechanically bonded to the side surfaces thereof. The first material is an abrasive substantially impenetrable material and the second material is a soft spunlaced fabric of high absorptive capacity. The differences in physical qualities of the first and second materials allow for one card to be used both as frequent cleaning card as well as a corrective cleaning card and provides a cleaning card that enables operation of the machine quickly after cleaning thereof.

23 Claims, 4 Drawing Sheets

FIG. 7(A)

SONTARA

| STYLE | UNIT WEIGHT oz/yd² (g/m²) | THICKNESS mils (mm) | SHEET GRAB TENSILE MD lbs (N) XD | | MULLEN BURST psi (kpa) | TYPICAL ROLL SIZE* in (cm) O.D. | yds (m) LIN. |
|---|---|---|---|---|---|---|---|
| 8001 | 1.0 (34) | 20 (.51) | 20(91) | 10 (44) | 35 (243) | 44 (112) | 4350 (3980) |

| PROPERTY | NOMINAL | OBSERVED VALUE +/- 3 SIGNS LOW    HIGH | | N (SAMPLES) | TEST METHOD Du PONT | COMPARABLE ASTM, ETC. |
|---|---|---|---|---|---|---|
| GRAVIMETRIC BASIS WEIGHT, oz/yd² | 1.00 | | | | 0018 | D3776 |
| INDIVIDUAL | | 0.61 | 1.19 | 1629 | | |
| ROLL (12 CHANNEL AVE.) | | 0.92 | 1.08 | 136 | | |
| | | | | | | |
| TENSILE (XD), lbs | 12.70 | | | | 0004 | D1682 |
| INDIVIDUAL | | 8.32 | 17.08 | 672 | | |
| ROLL (12 CHANNEL AVE.) | | 10.65 | 14.75 | 56 | | |
| | | | | | | |
| TENSILE (XD), lbs | 23.20 | | | | 0004 | D1682 |
| INDIVIDUAL | | 16.23 | 30.17 | 648 | | |
| ROLL (12 CHANNEL AVE.) | | 19.54 | 36.86 | 54 | | |

FIG. 7(B)

| STYLE | UNIT WEIGHT oz/yd² (g/m²) | THICKNESS mils (mm) | SHEET GRAB TENSILE MD lbs (N) | XD | MULLEN BURST psi (kpa) | TYPICAL ROLL SIZE* in (cm) O.D. | yds (m) LIN. |
|---|---|---|---|---|---|---|---|
| 8801 | 2.0 (68) | 16 (.41) | 35 (155) | 19 (85) | 44 (304) | 44 (112) | 3200 (2930) |

| PROPERTY | NOMINAL | OBSERVED VALUE +/- 3 SIGNS LOW | HIGH | N (SAMPLES) | TEST METHOD Du PONT | COMPARABLE ASTM, ETC. |
|---|---|---|---|---|---|---|
| GRAVIMETRIC BASIS WEIGHT, oz/yd² | 2.04 | | | | 0018 | D3776 |
| INDIVIDUAL | | 1.82 | 2.26 | 8627 | | |
| ROLL (12 CHANNEL AVE.) | | 1.92 | 2.16 | 720 | | |
| TENSILE (XD), lbs | 19.50 | | | | 0004 | D1682 |
| INDIVIDUAL | | 12.45 | 26.55 | 2724 | | |
| ROLL (12 CHANNEL AVE.) | | 16.34 | 22.66 | 227 | | |
| FRAZIER POROSITY, ft³/ft² per min | 100.00 | | | | 0028 | D737 |
| INDIVIDUAL | | 70.43 | 129.57 | 1632 | | |
| ROLL (12 CHANNEL AVE.) | | 82.87 | 117.13 | 136 | | |
| PABET ABRASION (VISUAL STD.) | 2.50 | | | | 0003 | D3884 |
| INDIVIDUAL | | 2.21 | 2.99 | 1332 | | |
| ROLL (6 CHANNEL AVE.) | | 2.29 | 2.91 | 222 | | |
| PERCENT POLYESTER | 44.30 | | | | 0097 | ----- |
| INDIVIDUAL | | 36.82 | 51.78 | 210 | | |
| ROLL (12 CHANNEL AVE.) | | 41.18 | 47.42 | 20 | | |

NOTES:
*FLAT SHAPED PROFILE

FIG. 8

REEMAY

| FIBER TYPE | STYLE | UNIT WEIGHT oz/yd$^2$ | THICKNESS mils | SHEET GRAB TENSILE MD lbs | SHEET GRAB TENSILE XD lbs | TRAPEZOID TEAR* MD lbs | TRAPEZOID TEAR* XD lbs | MULLEN BURST psi | FRAZIER AIR PERM CFM/ft$^3$ @0.5"H$_2$O |
|---|---|---|---|---|---|---|---|---|---|
| 4dpf. | 2006 | 0.60 | 5 | 10 | 8 | 4 | 5 | 11 | 1000 |
| STRAIGHT FIBERS | 2024 | 2.10 | 12 | 61 | 47 | 9 | 11 | 52 | 350 |

3M

LAPPING FILM FEATURES

| | | |
|---|---|---|
| COATING: | SLURRY COAT | |
| MINERAL: | $AL_2O_3$ | $0.3\mu - 60\mu$ |
| | $S_iC$ | $0.5\mu - 30\mu$ |
| | $Co/O$ | $0.5\mu$ |
| | $Cr_2O_3$ | $0.5\mu$ |
| | DIA | $0.1\mu - 45\mu$ |
| | CBN | $1\mu - 45 + 220$ MESH |
| RESIN: | WATERPROOF OIL RESISTANT STANDARD AND TYPE "F", TYPE "P", TYPE "B" | |
| BACKING: | POLYESTER FILM 0.5, 1, 1.5, 2, AND/3 MIL | |
| FORMS: | SHEETS, DISCS (PSA), ROLLS | |

DUAL PURPOSE CLEANING CARD

This application is a continuation of application Ser. No. 08/323,151, filed on Oct. 14. 1994, now U.S. Pat. No. 5,525,417.

BACKGROUND OF THE INVENTION

This invention relates generally to a dual purpose cleaning card. More specifically, this invention relates to a card for cleaning optical, magnetic, chip, and thermal read, write or print heads, photo and optic sensors and feed path and other rollers associated therewith.

In this information age and cashless society, the role and range of various card applications have become increasingly widespread. For example, a card which carries data of one type or another (e.gs. magnetic strip, bar code, proximity, Wiegan and smart cards) is used in credit card swipe readers, ATM/POS (Point of Sale) terminals, facsimile and copy machines, slot machines, petroleum card readers, check readers, thermal printers, credit vending machines, time/badge readers, telephone card readers, currency counters, hotel door locks and toll gates to name a few. The possibilities are endless. The data-carrying card is generally inserted through a slot in the processing equipment, where the card may be engaged by one or more feed rollers and passes by a read, write or print head and/or photo or optic sensor for processing data carried by the card. In other instances, a paper supply is stored within the equipment and dispensed outwardly through a slot generally by feed rollers. In most equipment, feed rollers are arranged in pairs such that the card passes between opposed rotating surfaces of the rollers.

The friction between the feed rollers and the card passing therethrough causes the transfer of contaminants from the card to the rollers. Similarly, the sensors and heads become contaminated. As the contaminants accumulate on the rollers, sensors and heads, their efficiency is reduced. For example, the contaminants may change the friction of the roller surfaces causing the rollers to slip. Similarly, contaminants can cause the rollers to lose their elastomers over time. Elastomers make the rollers soft and pliable and give the "grip" often needed to accept, for example, dollar bills, etc. They may reduce the gap through which the card passes, therefore making passage difficult. The contaminants can also render the processing equipment inoperable.

In order to operate the equipment efficiently, the rollers, sensors and/or heads must be cleaned. By cleaning them on a regular basis, dirt, magnetic oxides, ink residue, paper dust (flash) and numerous other contaminants may be removed from all types of concealed heads, photo and optic sensors, and feed path and other rollers. As a result of cleaning, the equipment operates more efficiently and equipment downtime and service calls are reduced.

One conventional method for cleaning the heads, sensors, and/or rollers is to use a cleaning card. The cleaning card has the approximate dimensions of the data-carrying card. Typically, cleaning cards are constructed as a laminate of a semirigid core of acrylic, PVC, PET, or ABS plastic material or the like, with nonwoven fibers of a soft substantially nonabrasive material chemically bonded to both of the side surfaces thereof. The cleaning card may be presaturated with a solvent or the solvent may be added just prior to use of the cleaning card. Unfortunately, the chemical bonding process includes binders, adhesives, and other materials which are necessary for the lamination process, but which, in the presence of the solvents required for cleaning, will deteriorate and thus undermine the structural integrity of the card. A nonlaminated cleaning card has been described in U.S. Pat. No. 5,227,226 to Rzasa. The nonlaminated cleaning card is porous allowing penetration of the cleaning solvent. If the equipment is exposed to such cleaning solvent for too long a period of time, the equipment may be deleteriously affected. Moreover, conventional cleaning cards often disadvantageously introduce static into the equipment.

Another conventional method is to remove the contaminants by wiping the surface of the heads and rollers with a soft paper or rag impregnated with a cleaning solvent. In this case, however, it is necessary to disassemble the equipment for exposing the rollers and heads.

For low usage equipment, the recommended cleaning schedule is one time per week. For high usage, it is daily. Unfortunately, the heads are sensitive and can be damaged by rough cleaning and/or by the prolonged exposure to cleaning solvents.

Preventive maintenance is when the contaminants are cleaned off on a regular basis before the contaminants stop the equipment from working. A Preventive Maintenance card removes the easy-to-remove contaminants. Corrective maintenance is done to remove stubborn, burnt-in contaminants that prevent the equipment from working. For example, a thermal printer head heats up and burns in contaminants that a Preventive Maintenance card may not remove.

None of the prior cleaning methods adequately removes stubborn contaminates and the prolonged exposure to a cleaning solvent causes deterioration of the processing equipment and the cleaning card and slow down of the equipment.

Accordingly, there has been a need for one cleaning card which is effective in removing stubborn contaminates and for daily cleaning making the cleaning process faster, thus keeping the equipment running efficiently and with little interruption. There is also a need for a cleaning card that shortens the equipment exposure to the solvent. There is a further need for a cleaning card that is not subject to deterioration by the cleaning solvent. There is an additional need for one dual purpose card that can do both preventive and corrective maintenance while not building up a static charge. The present invention fulfills these needs and provides other related advantages.

SUMMARY OF THE INVENTION

The present invention resides in a dual purpose cleaning card for use in cleaning rollers, sensors, and read, write and print heads of equipment in which cards carrying data are used. The cleaning card comprises, generally, a flat, semirigid base with a first material mechanically bonded to a first side surface and a second material mechanically bonded to a second side surface thereof. The mechanical bonding process is also claimed.

In a preferred form of the invention, the cleaning card provides a way to make the cleaning of equipment quicker and effective for removing stubborn contaminates. The base includes a flat, semirigid generally rectangular piece of acrylic, PVC, PET, or ABS or the like plastic material. The base is generally sized to conform to the same dimensions of the card which carries the data and may be colored to increase its opacity and thus its ability to be accepted into some equipment.

In a first preferred embodiment, the first material mechanically bonded to a first side surface is substantially abrasive. One example is Reemay® from Reemay, a nonwoven spunbonded polyester. This material is substantially impenetrable to restrict absorption of a cleaning solvent.

The second material mechanically bonded to a second surface comprises a spunlaced nonwoven fabric such as DuPont's Sontara® which is soft, substantially nonabrasive, lightweight, and drapable. This material is substantially penetrable to improve absorption of the cleaning solvent.

In an alternative embodiment, the abrasive first material is 3M Imperial Lapping Film, also a substantially impenetrable material.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIGS. 7 and 8 are tables showing the physical properties of the first and second materials.

DETAILED DESCRIPTION OF THE PREFERRED EMBODIMENTS

Figure 1:
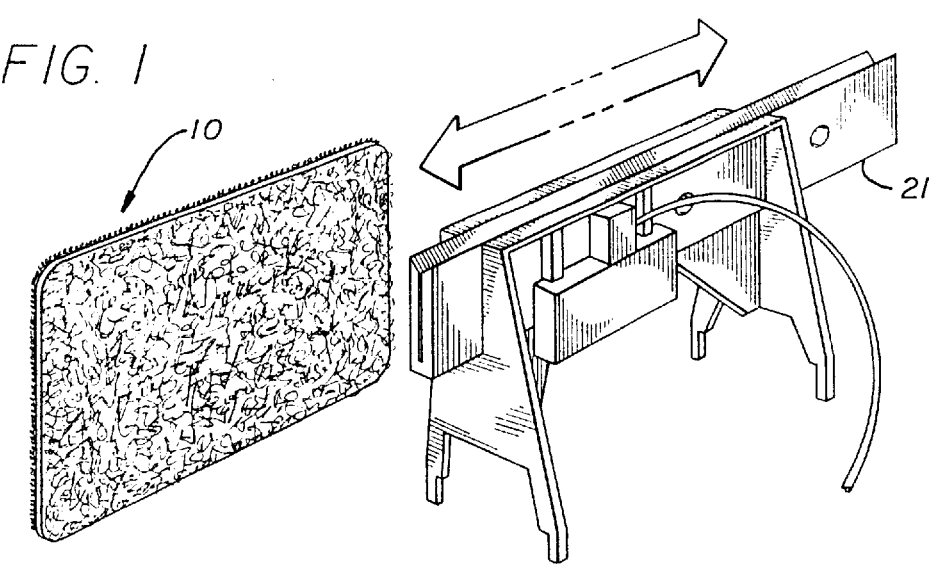
FIG. 1 is a perspective environmental view of a cleaning card embodying the invention, illustrating its use in an exemplary swipe reader.
Figure 2:
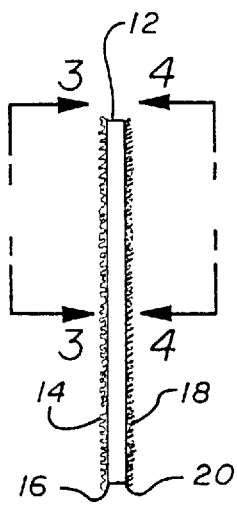
FIG. 2 is an end view of the card of FIG. 1, showing a first side surface with a first material bonded thereon, and a second side surface with a second material bonded thereon.

As shown in the drawings for purposes of illustration, the present invention is concerned with a dual purpose cleaning card, generally designated in the accompanying drawings by the reference number 10. The cleaning card 10 comprises, generally, a flats semirigid and generally rectangular base 12 with a first substantially abrasive material 14 mechanically bonded to a first side surface 16, and a second nonwoven soft material 18 mechanically bonded to a second side surface 20 thereof for picking up contaminants as the card passes through equipment and thus removing the contaminants from the equipment. The cleaning card second side surface may be presaturated with a cleaning solvent such as anhydrous alcohol (isopropanol) or the solvent added just prior to use.

In accordance with the present invention, the cleaning card 10 allows for faster and more efficient cleaning of both stubborn contaminants and for daily cleaning of contaminants. The cleaning card may be colored in order to increase its opacity in order to trigger a sensor on some equipment. If inadequately opaque, the equipment may not accept the cleaning card much like the dollar bill validator may not accept bills in less than pristine condition. Neither a white laminated nor nonlaminated cleaning card work on such equipment. For example, without sufficient opacity, cleaning cards may not work at all in almost all gaming and wagering machines. Black is often the color used for sufficient opacity.

The base 12 is preferably constructed of acrylic, PVC, PET, ABS plastic material or the like. It is generally rectangular and sized in accordance with the card that carries the data. The thickness of the card may obviously vary depending on its use. It is preferred that the base 12 be approximately 0.006–0.024 mils thick.

The plastic base may also include an anti-static compound to prevent the buildup of static inside the static sensitive processing equipment. Most insert readers and all dollar bill validators, for example, move the cleaning card back and forth several times to "validate" the card. This back and forth motion generates a potential static charge buildup. By adding a static inhibitor, there is little if any static buildup during this attempted "validation" process. One useful anti-static compound is available from Gen-Labs, Inc. (formerly General Chemicals) Chino, Calif. as "Anti-Static Glass Cleaner." Other anti-static compounds that may be used are well known in the art.

The fibers of the first and second materials 14 and 18 are mechanically bonded to the first and second side surfaces 16 and 20 of the base by a extrusion lamination process wherein the plastic base material is extruded into the shape of a sheet and the first and second materials pressed upon the first and second surfaces of the molten plastic until the fibers mechanically bond to the side surfaces 16 and 20 thereof. Calendaring rolls apply pressure. The base plastic is then cooled which stiffens up the card. By using a mechanical bond rather than a chemical bond, the need for adhesives and all their attendant problems are eliminated. For example, the structural integrity of the card is not subjected to deterioration when the cleaning solvent is added.

Figure 3:
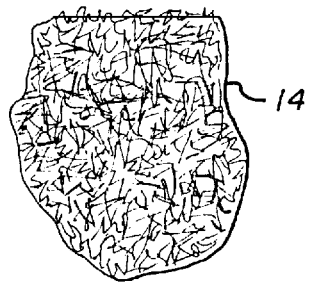
FIG. 3 is an enlarged fragmented plan view of the first material taken generally along the line 3—3 of FIG. 2.
Figure 4:
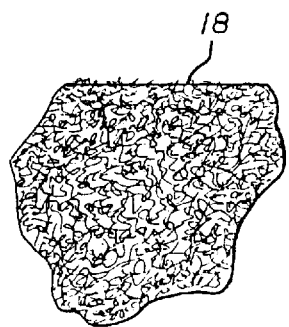
FIG. 4 is an enlarged fragmented plan view of the second material taken generally along the line 4—4 of FIG. 2.

In the first embodiment, the first material 14 is preferably a nonwoven spunbonded polyester, with a higher friction coefficient than the second material. One example of such material includes Reemay® 2000 or 2200 series. Reemay® is available from Reemay, Inc., Old Hickory, Tenn. Reemay® is an abrasive material with little absorptive capacity and is traditionally used for a wide variety of applications unrelated to cleaning cards. With a relatively thin cleaning card (e.g., 0.010 mils), the preferred style Reemay® is 2006. For a thicker base (e.g., 0.024 mils) Reemay® style 2024 is preferred. As shown in FIG. 3, the first material has a larger surface area than the second material shown in FIG. 4. The larger surface area permits faster evaporation of any alcohol that is absorbed, yet it picks up more dirt than the second material. Furthermore, the first material is more durable and rugged then the second material thereby increasing the longevity of the dual purpose cleaning card over a conventional card.

The second material 18 is preferably a spunlaced fabric with excellent softness and draping qualities. It should be strong, and lightweight. One such fabric is sold under the brand name Sontara® available from DuPont, Wilmington, Del. With a relatively thin base, the preferred style Sontara® is 8001. With a thicker base, Sontara style 8801 is used. The softness of the fabric and its absorptive capacity permits its use as a cleaning card used on a frequent and regular basis. Its absorptive capacity permits the cleaning fluid or solvent to be absorbed into the second material. Wicking action of the second material draws the cleaning solvent up so that it is the side that contains most, if not all of the cleaning solvent. This wicking action keeps the cleaning solvent where it is most desired. By contrast, the Rzasa nonlaminated cleaning card allows the solvent to be virtually everywhere and not in the most desired section of the card. The nonlaminated card also allows the cleaning solvent to drip through it and may drip onto other sensitive components, including electrical, in the equipment. The laminated cleaning card of the present invention does not allow this to happen.

Figure 6:
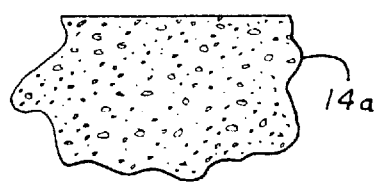
FIG. 6 is an enlarged fragmented plan view of an alternative first material.

In an alternative embodiment, as shown in FIG. 6, Imperial Lapping Film (ILF) 14a from 3M Corp., St. Paul, Minn. is used as the abrasive first material. The 3M Imperial Lapping Film is 3 mil made from Aluminum oxide, 9 microns, 1200 mesh size. This material is also substantially impenetrable to cleaning solvents.

FIGS. 7 and 8 provide a table listing the physical properties of the preferred and alternative materials.

Figure 5:
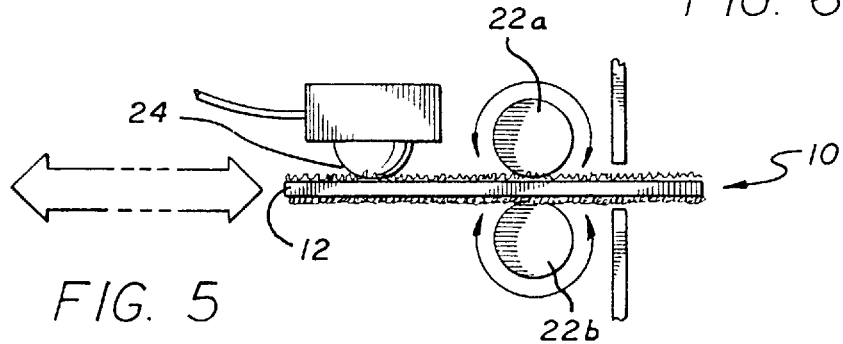
FIG. 5 is another end view of the card of FIG. 1, illustrating the manner in which the cleaning card passes by an exemplary magnetic head, and between a pair of rollers.

In use of the invention, as shown in FIGS. 1 and 5, the cleaning card is passed through the equipment (an exemplary swipe reader 21 in FIG. 1) in the same manner as the card carrying information. The cleaning card picks up contaminants as it passes between a pair of rollers 22a and 22b and against the head 24. A backstop (not shown) opposite the head 24 keeps the card 10 in contact with the head. The backstop is usually made from an abrasion-resistant hard plastic, but it can also be a rubber roller.

For preventive maintenance, the second side surface having the soft material and solvent thereon must be positioned to pass against the head 24 and the roller 22a on the same side as the head (See FIG. 5). The abrasive first side 16 of the cleaning card 10 passes against the other roller 22b and the backstop. The rollers 22a and 22b and backstop are more resistant to abrasion and are less critical components than the head 24.

For corrective maintenance, the abrasive first side surface 16 is passed against the head 24 or rollers 22a and 22b, thereby removing stubborn contaminants that have become encrusted or fixed onto the head, rollers, etc. Since the abrasive first material 14 is resistant to absorption by the cleaning solvent, using the one card with a "wet" softer side first followed by the "dry" abrasive side also permits a quicker cleanup which restores operations more quickly and reduces the equipment's exposure to the cleaning solvent. Use of the abrasive surface thus reduces equipment downtime and service calls. It eliminates the need for equipment disassembly.

The abrasive surface obviously cannot and should not be used on a frequent basis but can be used when corrective heavy duty cleaning is required and equipment disassembly is undesirable. Although this discussion has been limited to rollers, sensors and heads, it should be appreciated that the cleaning cards of the present invention can be used to clean other equipment such as strippers, guide rollers, paper pad and metal plates.

Although a particular embodiment of the invention has been described in detail for purposes of illustration, various modifications may be made without departing from the spirit and scope of the invention. Accordingly, the invention is not to be limited, except as by the amended claims.

I claim:

1. A dual purpose cleaning card for cleaning equipment, said cleaning card comprising:

a flat, semirigid base having a first side surface and a second side surface;

a first abrasive material bonded to said first side surface of said base, said first abrasive material being substantially impenetrable to cleaning solvents; and a second soft non-abrasive material bonded to said second side surface of said base, said second soft non-abrasive material being a spunlaced fabric that is penetrable to cleaning solvents.

2. The cleaning card of claim 1, wherein said second material is presaturated with a cleaning solvent.

3. The cleaning card of claim 1, wherein said base is plastic and sized to conform to the dimensions of a data-carrying card used in said equipment.

4. The cleaning card of claim 1, wherein said first material is nonwoven spunbonded polyester.

5. The cleaning card of claim 1, wherein said first material is a spunbonded polyester.

6. The cleaning card of claim 1, wherein said first material is a lapping film.

7. The cleaning card of claim 1, wherein at least one of said first and second materials are extrusion bonded to said first and second side surfaces of said base.

8. The cleaning card of claim 1, wherein said base is darkly colored to increase its opacity, whereby it is adapted to be accepted into equipment.

9. The cleaning card of claim 1, wherein said first material has a higher friction coefficient than said second material.

10. The cleaning card of claim of 1, further comprising an anti-static material.

11. A cleaning card for cleaning equipment, said cleaning card comprising:

a plastic base having a first side surface and a second side surface;

a first abrasive material extrusion bonded to said first side surface of said base, said first abrasive material being substantially impenetrable to cleaning solvents; and a second soft non-abrasive material extrusion bonded to said second side surface of said base, said second soft non-abrasive material being a spunlaced fabric that is penetrable to cleaning solvents.

12. The cleaning card of claim 11, wherein said second material is presaturated with a cleaning solvent.

13. The cleaning card of claim 11, wherein said base is plastic and sized to conform to the dimensions of a data-carrying card used in said equipment.

14. The cleaning card of claim 11, wherein said first material is nonwoven spunbonded polyester.

15. The cleaning card of claim 11, wherein said first material is a spunbonded polyester.

16. The cleaning card of claim 11, wherein said first material is a lapping film.

17. The cleaning card of claim 11, wherein said base is darkly colored to increase its opacity, whereby it is adapted to be accepted into equipment.

18. The cleaning card of claim 11, wherein said first material has a higher friction coefficient than said second material.

19. The cleaning card of claim of 11, further comprising an anti-static material.

20. A dual purpose cleaning card for cleaning equipment, said cleaning card comprising:

a flat, semirigid base having a first side surface and a second side surface;

a first abrasive material bonded to said first side surface of said base, said first abrasive material being a lapping film that is substantially impenetrable to cleaning solvents; and a second soft non-abrasive material bonded to said second side surface of said base, said second soft non-abrasive material being penetrable to cleaning solvents.

21. A dual purpose cleaning card for cleaning equipment, said cleaning card comprising:

a flat, semirigid base having a first side surface and a second side surface;

a first abrasive material bonded to said first side surface of said base, said first abrasive material being substantially impenetrable to cleaning solvents;

a second soft non-abrasive material bonded to said second side surface of said base, said second soft non-abrasive material being penetrable to cleaning solvents; and said cleaning card further comprising an anti-static material.

22. A cleaning card for cleaning equipment, said cleaning card comprising:

a plastic base having a first side surface and a second side surface;

a first abrasive material extrusion bonded to said first side surface of said base, said first abrasive material being a lapping film that is substantially impenetrable to cleaning solvents; and a second non-abrasive material extrusion bonded to said second side surface of said base, said second soft non-abrasive material being penetrable to cleaning solvents.

23. A cleaning card for cleaning equipment, said cleaning card comprising:

a plastic base having a first side surface and a second side surface;

a first abrasive material extrusion bonded to said first side surface of said base, said first abrasive material being substantially impenetrable to cleaning solvents;

a second non-abrasive material extrusion bonded to said second side surface of said base, said second soft non-abrasive material being penetrable to cleaning solvents; and said cleaning card further comprising an anti-static material.

* * * * *